C. LIGHTFOOT.
SAFETY RELIEF DEVICE FOR GASES UNDER PRESSURE.
APPLICATION FILED OCT. 12, 1912.
1,068,675.
Patented July 29, 1913.
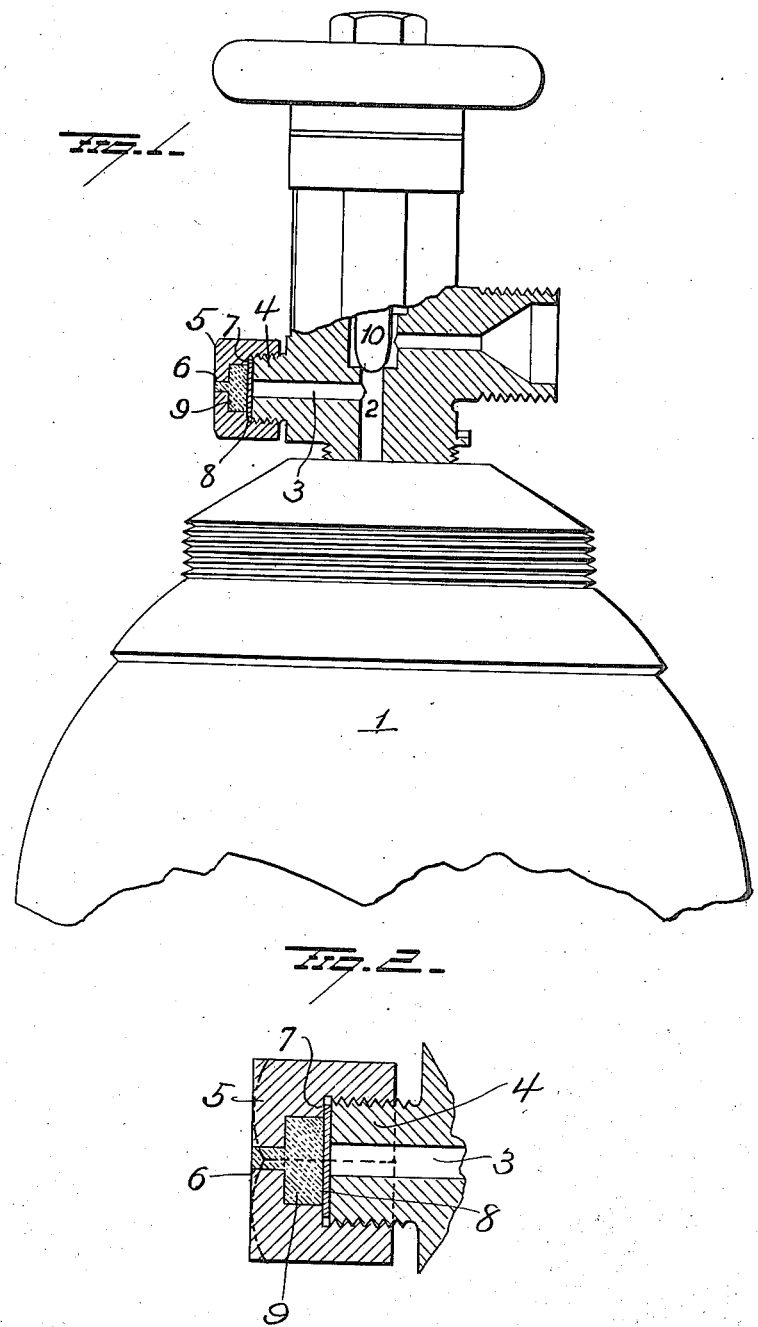

UNITED STATES PATENT OFFICE.

CECIL LIGHTFOOT, OF BUFFALO, NEW YORK, ASSIGNOR TO THE LINDE AIR PRODUCTS COMPANY, OF CLEVELAND, OHIO, A CORPORATION OF OHIO.

SAFETY RELIEF DEVICE FOR GASES UNDER PRESSURE.

1,068,675.   Specification of Letters Patent.   Patented July 29, 1913.

Application filed October 12, 1912. Serial No. 725,551.

*To all whom it may concern:*

Be it known that I, CECIL LIGHTFOOT, a subject of King George V, residing at Buffalo, in the county of Erie and State of New York, have invented certain new and useful Improvements in Safety Relief Devices for Gases Under Pressure; and I do hereby declare the following to be a full, clear, and exact description of the invention, such as will enable others skilled in the art to which it appertains to make and use the same.

My invention relates to an improvement in safety relief devices for gases under pressure, the object being to provide a seal which under certain conditions, will be ruptured and thus permit the gas to escape, and it consists in a copper or other disk incapable by itself of resisting the pressure of the gas, and closing a port leading from the tank, and a fusible metal forming a seat and support for said disk, so that when the fusible metal is melted by a rise in temperature, the disk will be ruptured by the internal pressure and permit the gas to escape.

My invention further consists in the details of construction as will be more fully described and pointed out in the claims.

The accompanying drawing Figure 1 is a view of one end of a gas storage tank showing my improvement applied thereto, and Fig. 2 is an enlarged view in section through the nipple and safety relief device.

1 represents a tank, and 2 is a port. This port 2 may be in the tank, but is preferably formed in the valve casing and is so shown in the drawing. This port 2 is controlled by a valve 10, and 3 is a port leading from port 2 through the nipple 4, which in the present instance is integral with the valve casing, but which if the port 2 be formed in the tank, would be integral with the tank. I would therefore have it understood that the term "tank having a port" or similar expression, is intended to include a structure wherein the port is in a part attached to the tank. This nipple 4 is screw threaded externally to receive the nut 5 which latter is counterbored as shown, and is also provided with a port 6 leading from the counterbore through the nut. The nut 5 is provided with the internal annular shoulder 7, between which and the outer end of the nipple 4, the edge or periphery of a copper or other metal disk 8 is clamped.

Located within and filling the counterbore of the nut and also filling the port 6, if desired, is a fusible metal seal 9 which melts at about 206° F. This metal seal forms a closure for the port 6 and a support or seat for the disk 8, and so long as the seal remains intact, the disk will be supported and prevented from being distended and ruptured by the pressure of the gas within the tank, but if the temperature rises to the melting point of the seal, the latter will melt and run out through the port 6, thus leaving the disk unsupported. The pressure within the tank will then distend and rupture the disk and permit the gas to escape through port 6. The metal seal, at the low melting point above referred to, would not of itself be sufficient to withstand the high pressure within the tank, but when reinforced by the disk 8, their combined action seals the tank until the disk is left unsupported.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In a safety relief device for gases under pressure, the combination of a tank having a port, an imperforate frangible disk closing said port, and a fusible metal plug covering the outer face of the disk and forming a back support for the latter, the resistance of the disk when the fusible metal is fluid being less than the normal charging pressure for the tank.

2. In a safety relief device for gases under pressure, the combination of a tank having a port, an imperforate frangible disk closing said port, the resistance of this disk being less than the normal charging pressure for the tank, means for securing the disk over the port and a fusible metal plug carried by said disk securing means and covering the rear face of the disk and forming a back support for the latter.

3. In a safety relief device for gases under pressure, the combination of a tank having a port, an imperforate frangible disk closing said port, a fusible metal seat covering the outer face of said disk and forming a back support for the latter, and means secured to the tank and carrying the disk and fusible metal seat.

4. In a safety relief device for gas under pressure, the combination of a tank having a gas escape port, an imperforate frangible disk covering the outer end of said port, the resistance of said disk being less than the normal charging pressure for the cylinder, and a nut carrying a fusible metal seat for the frangible disk, the said metal seat covering the outer face of the disk and forming a backing for the latter.

5. In a safety relief device, the combination of a tank having a nipple, the latter having a port through same, a nut, an imperforate frangible disk clamped against the nipple by the nut and closing the port, the nut having an opening through same at the outer side of the disk, and a fusible metal filling said recess and forming a backing for that portion of the disk that is in line with the port through the nipple.

6. In a safety relief device for gas under pressure, the combination of a tank having a port, an imperforate disk closing said port, and a fusible metal support for the imperforate disk, the said support covering the outer face of said disk and forming a backing for the same, the said disk and its fusible metal support being separately incapable of resisting the pressure within the tank.

In testimony whereof, I have signed this specification in the presence of two subscribing witnesses.

CECIL LIGHTFOOT.

Witnesses:
C. H. O. JENKINS,
T. D. WOODRUFF.